US010605920B2

(12) United States Patent
Liu et al.

(10) Patent No.: US 10,605,920 B2
(45) Date of Patent: Mar. 31, 2020

(54) POWER SAVINGS THROUGH REFRESH CONTROL FOR DISTANCE SENSING DEVICES

(71) Applicant: ams Sensors Singapore Pte. Ltd., Singapore (SG)

(72) Inventors: Yang Liu, Shanghai (CN); Vincenzo Condorelli, Altendorf (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 563 days.

(21) Appl. No.: 15/405,363

(22) Filed: Jan. 13, 2017

(65) Prior Publication Data

US 2017/0199276 A1    Jul. 13, 2017

Related U.S. Application Data

(60) Provisional application No. 62/278,055, filed on Jan. 13, 2016.

(51) Int. Cl.
| | | |
|---|---|---|
| *G01C 3/08* | (2006.01) | |
| *G01S 17/36* | (2006.01) | |
| *G01S 7/497* | (2006.01) | |
| *G01S 17/89* | (2020.01) | |
| *G01S 17/66* | (2006.01) | |

(52) U.S. Cl.
CPC .............. *G01S 17/36* (2013.01); *G01S 7/497* (2013.01); *G01S 17/66* (2013.01); *G01S 17/89* (2013.01)

(58) Field of Classification Search
None
See application file for complete search history.

(56) References Cited

U.S. PATENT DOCUMENTS

| | | | | | |
|---|---|---|---|---|---|
| 5,208,591 | A | * | 5/1993 | Ybarra | G01S 7/2923 340/961 |
| 5,576,834 | A | * | 11/1996 | Hamada | G01J 9/0246 356/452 |
| 6,037,584 | A | * | 3/2000 | Johnson | H04N 1/486 250/234 |
| 6,900,757 | B1 | * | 5/2005 | Dimitrov | H01Q 1/1257 342/352 |
| 9,170,095 | B1 | | 10/2015 | Tachibana | |
| 9,955,237 | B2 | * | 4/2018 | Cornwall | H04Q 9/00 |

(Continued)

FOREIGN PATENT DOCUMENTS

| | | | | |
|---|---|---|---|---|
| WO | WO-2007069996 A1 | * | 6/2007 | ......... B60K 31/0066 |
| WO | WO-2015186309 A1 | * | 12/2015 | ............. G01C 21/16 |

OTHER PUBLICATIONS

Kalman and Extended Kalman Filters: Concept, Derivation and Properties Maria Isabel Ribeiro Institute for Systems and Robotics, Instituto Superior Tecnico (Year: 2004).*

(Continued)

*Primary Examiner* — Isam A Alsomiri
*Assistant Examiner* — Amir J Askarian
(74) *Attorney, Agent, or Firm* — Michael Best & Friedrich LLP

(57) ABSTRACT

The present disclosure describes refresh control methods for generating distance data and optoelectronic modules that are operable to provide distance information at a predetermined refresh rate, but with a reduction in overall power consumption attributable to the distance determinations.

17 Claims, 3 Drawing Sheets

(56) References Cited

U.S. PATENT DOCUMENTS

| | | | |
|---|---|---|---|
| 10,323,947 B2* | 6/2019 | Mishina | G01C 21/28 |
| 2002/0183071 A1* | 12/2002 | Shioda | G01S 5/021 |
| | | | 455/456.1 |
| 2004/0130532 A1* | 7/2004 | Gordon | G06F 1/3203 |
| | | | 345/166 |
| 2009/0069952 A1* | 3/2009 | Kikuchi | G01S 13/931 |
| | | | 701/1 |
| 2010/0164807 A1* | 7/2010 | Tseng | G01C 21/165 |
| | | | 342/386 |
| 2010/0176988 A1* | 7/2010 | Maezawa | G01S 19/45 |
| | | | 342/357.25 |
| 2011/0087431 A1* | 4/2011 | Gupta | G01S 5/0018 |
| | | | 701/408 |
| 2011/0099014 A1* | 4/2011 | Zopf | G10L 19/16 |
| | | | 704/262 |
| 2011/0261193 A1* | 10/2011 | Agurok | F41H 13/00 |
| | | | 348/135 |
| 2011/0320766 A1* | 12/2011 | Wu | G06F 9/30076 |
| | | | 712/28 |
| 2012/0313816 A1* | 12/2012 | Menegozzi | G01S 3/48 |
| | | | 342/357.25 |
| 2013/0002470 A1* | 1/2013 | Kambe | G01S 13/867 |
| | | | 342/55 |
| 2013/0064042 A1* | 3/2013 | Aarts | G01S 7/534 |
| | | | 367/99 |
| 2013/0242284 A1* | 9/2013 | Zeng | G01S 17/66 |
| | | | 356/4.01 |
| 2014/0005932 A1* | 1/2014 | Kozak | G01C 21/30 |
| | | | 701/446 |
| 2014/0204036 A1* | 7/2014 | Schillings | G06F 3/04883 |
| | | | 345/173 |
| 2014/0274125 A1* | 9/2014 | Sendonaris | G01S 5/02 |
| | | | 455/456.1 |
| 2015/0015432 A1* | 1/2015 | Chang | G01S 7/032 |
| | | | 342/22 |
| 2015/0234041 A1* | 8/2015 | Aoki | G01S 7/4004 |
| | | | 342/70 |
| 2015/0277710 A1* | 10/2015 | Lee | G06F 3/0488 |
| | | | 715/822 |
| 2015/0285625 A1 | 10/2015 | Deane | |
| 2016/0084942 A1* | 3/2016 | Mizutani | G01S 13/345 |
| | | | 701/96 |
| 2016/0131750 A1* | 5/2016 | Lu | G01S 11/06 |
| | | | 342/458 |
| 2016/0280263 A1* | 9/2016 | Mori | B62D 15/027 |
| 2017/0045610 A1* | 2/2017 | Mizutani | G01S 7/41 |
| 2017/0074980 A1* | 3/2017 | Adib | G01S 7/35 |
| 2017/0146646 A1* | 5/2017 | Nakabayashi | G01S 7/35 |
| 2018/0347990 A1* | 12/2018 | Mishina | G01C 21/28 |

OTHER PUBLICATIONS

Real-time 3-D Pose Estimation Using a High-speed Range Sensor David A. Simon, Martial Hebert and Takeo Kanade the Robotics Institute, Carnegie Mellon University (Year: 1994).*

* cited by examiner

POWER SAVINGS THROUGH REFRESH CONTROL FOR DISTANCE SENSING DEVICES

TECHNICAL FIELD

This disclosure relates to power savings through refresh control for distance sensing devices such as time-of-flight (TOF) modules.

BACKGROUND

Time-of-flight (TOF) is a technique used to determine the distance to an object or objects in a three-dimensional scene. Such techniques can be used to construct three-dimensional representations of an object or a three-dimensional scene. TOF-based optoelectronic modules frequently employ a modulated light source, a series of optical elements, and a demodulation pixel or demodulation pixel array. Modulated light projected from a modulated light source onto an object in a scene may be reflected to an imaging assembly and focused onto a demodulation pixel. The demodulation pixel and supporting circuitry, may detect a phase shift in the reflected light, wherein the phase shift may be further correlated to the distance the light traveled; specifically, the detected phase shift is the phase shift in the modulated light that transpires when the modulated light travels from the light source to the object and is reflected back to the TOF module. Accordingly, the phase shift (phase delay) is proportional to the transit time as expressed below:

$$t_{tof} = -\frac{\phi_{tof}}{2\pi f_{mod}}$$

where $t_{tof}$ is the time-of-flight, $\phi_{tof}$ is the phase shift of the modulated light signal, and the respective modulation frequency is $f_{mod}$. The distance to the object ($R_{tof}$) can then be calculated according to the following:

$$R_{tof} = \frac{t_{tof} \cdot c}{2}$$

where c is the speed of light. Alternatively, the round trip time can be directly measured in order to calculate the distance to the object.

Other techniques may be employed for determining distances to objects in a scene such as triangulation. Triangulation-based optoelectronic modules often use a light source, a series of optical elements, and a pixel array. As above, light projected from the light source and reflected by an object in a scene may be focused onto the pixel array via the optical elements. Distance to the object then is determined via a standard triangulation technique where distance is determined from the focal length (i.e., on-axis focal length) of the series of optical elements, the position of the pixel on which the reflected light is focused (e.g., as a spot), and the baseline distance between the on-axis focal length and the illumination source. ($R_{tri}$ is the distance information obtained by the triangulation measurement; f is the on-axis focal length; b is baseline; $x_{pix}$ is the location of the pixel on which the reflected light is focused (e.g., a spot of light); $\alpha$ is the angle between emitted signal and measurement axis $$R_{tri} = \frac{f \cdot b}{x_{pix} + f\tan(\alpha)}$$

Further, if $\alpha=0$ the formula simplifies to $R_{tri}=(f\times b)/x_{pix}$). TOF can yield superior distance data for some applications while triangulation may be better suited to other applications.

Small distance-measurement opto-electronic modules can be used in a wide range of applications. For example, they can be integrated into smart phones or other small electronic devices such as handheld or other Internet-enabled (or other network-enabled) personal computing devices, including personal computers, e-books, kiosks, tablets and media players. In the context of smart phones, for example, the small distance-measurement modules can be used to determine the distance between a display screen and the user's hand for gesture recognition. In some instances, the distance measurement modules can be used to determine the distance from the device to a user's body (e.g., face or ear) to determine when the user likely is not looking at the display such that the brightness level for the display screen can be reduced.

An important characteristic of distance-measurement modules for some applications is the required refresh rate, in other words, the frequency at which the module (or the host device) is supposed to measure distance. One factor impacting the refresh rate is the maximum latency, which reflects how quickly the module (or host device) needs to detect movement of an external object. The distance measurement refresh rate also depends on the maximum acceptable error at any given time.

Turning on the distance-measurement module's light source tends to consume a relatively large amount of energy. Thus, in battery-operated devices, a high refresh rate can cause the battery to discharge more quickly.

SUMMARY

The present disclosure describes refresh control methods for generating distance data and optoelectronic modules that are operable to provide distance information at a predetermined refresh rate, but with a reduction in overall power consumption attributable to the distance determinations. For example, rather than causing a light emitter to emit light signals each and every time distance information needs to be generated, in some instances the distance information is extrapolated. The power consumption for computing the extrapolated distance information tends to be less than the power consumption required for actual distance measurements (i.e., during which the emitter emits a light signal). Thus, extrapolating the distance information at least some of the time rather than making an actual distance measurement can help reduce overall power consumption. The decision as to how often and when to extrapolate distance information should be balanced with the need for accuracy in the distance data.

For example, in one aspect, a refresh control method for generating distance data, includes generating distance data in accordance with a specified refresh rate, wherein some of the time the distance data is generated by an optoelectronic module performing actual distance measurements, and some of the time the distance data is generated by extrapolation. The method includes determining whether a number of consecutive times distance data has been generated by extrapolation is at least as high as a specified maximum permitted number of times. If, just prior to a current instance of distance data generation, the number of consecutive times distance data has been generated by extrapolation is at least as high as the specified maximum permitted number of times, then performing an actual distance measurement by the optoelectronic module to generate the distance data for the current instance.

In another aspect, an optoelectronic module is operable to generate distance data. The module includes an illumination assembly comprising an emitter operable to emit light signals at a particular wavelength or in a particular wavelength range. The module also includes an imaging assembly comprising pixels to detect light reflected by an object external to the module, the reflected light being at the particular wavelength or in the particular wavelength range. A processor system is operable to generate distance data in accordance with a specified refresh rate, wherein some of the time the distance data is generated by causing the emitter to emit a light signal for performance of actual distance measurements, and some of the time the distance data is generated by the processor extrapolating the distance data based on previously acquired data. The processor further is operable to determine whether a number of consecutive times distance data has been generated by extrapolation is at least as high as a specified maximum permitted number of times. If, just prior to a current instance of distance data generation, the number of consecutive times distance data has been generated by extrapolation is at least as high as the specified maximum permitted number of times, the processor causes the emitter to emit a light signal for performance of an actual distance measurement that the processor uses to generate the distance data for the current instance.

In yet a further aspect, a handheld computing device includes a rechargeable power source, an illumination assembly, an imaging assembly and a processor. The illumination assembly includes an emitter operable to emit light signals at a particular wavelength or in a particular wavelength range. The imaging assembly includes pixels to detect light reflected by an object external to the handheld computing device, the reflected light being at the particular wavelength or in the particular wavelength range. The processor system is operable to generate distance data in accordance with a specified refresh rate, wherein some of the time the distance data is generated by causing the emitter to emit a light signal for performance of actual distance measurements, and some of the time the distance data is generated by the processor extrapolating the distance data based on previously acquired data. The processor further is operable to determine whether a number of consecutive times distance data has been generated by extrapolation is at least as high as a specified maximum permitted number of times. If, just prior to a current instance of distance data generation, the number of consecutive times distance data has been generated by extrapolation is at least as high as the specified maximum permitted number of times, then the processor causes the emitter to emit a light signal for performance of an actual distance measurement that the processor uses to generate the distance data for the current instance.

Some implementations include one or more of the following features. For example, in some cases, the processor system determines whether a speed of an object, with respect to which distance is to be determined, is greater than a specified maximum speed, and if it determined that the speed of the object is greater than the specified maximum speed, then an actual distance measurement is performed by the optoelectronic module to generate the distance data for the current instance. In some instances, the processor system determines whether an extrapolated value of the object's speed is greater than the specified maximum speed, and if the extrapolated value of the object's speed is greater than the specified maximum speed, then an actual distance measurement is performed by the optoelectronic module to generate the distance data for the current instance.

In some implementations, if the number of consecutive times distance data has been generated by extrapolation is less than the specified maximum permitted number of times and if the extrapolated value of the object's speed is not greater than the specified maximum speed, then the distance data for the current instance is generated by extrapolation.

Other aspects, features and advantages will be readily apparent form the following detailed description, the accompanying drawings, and the claims.

DETAILED DESCRIPTION

Figure 1:
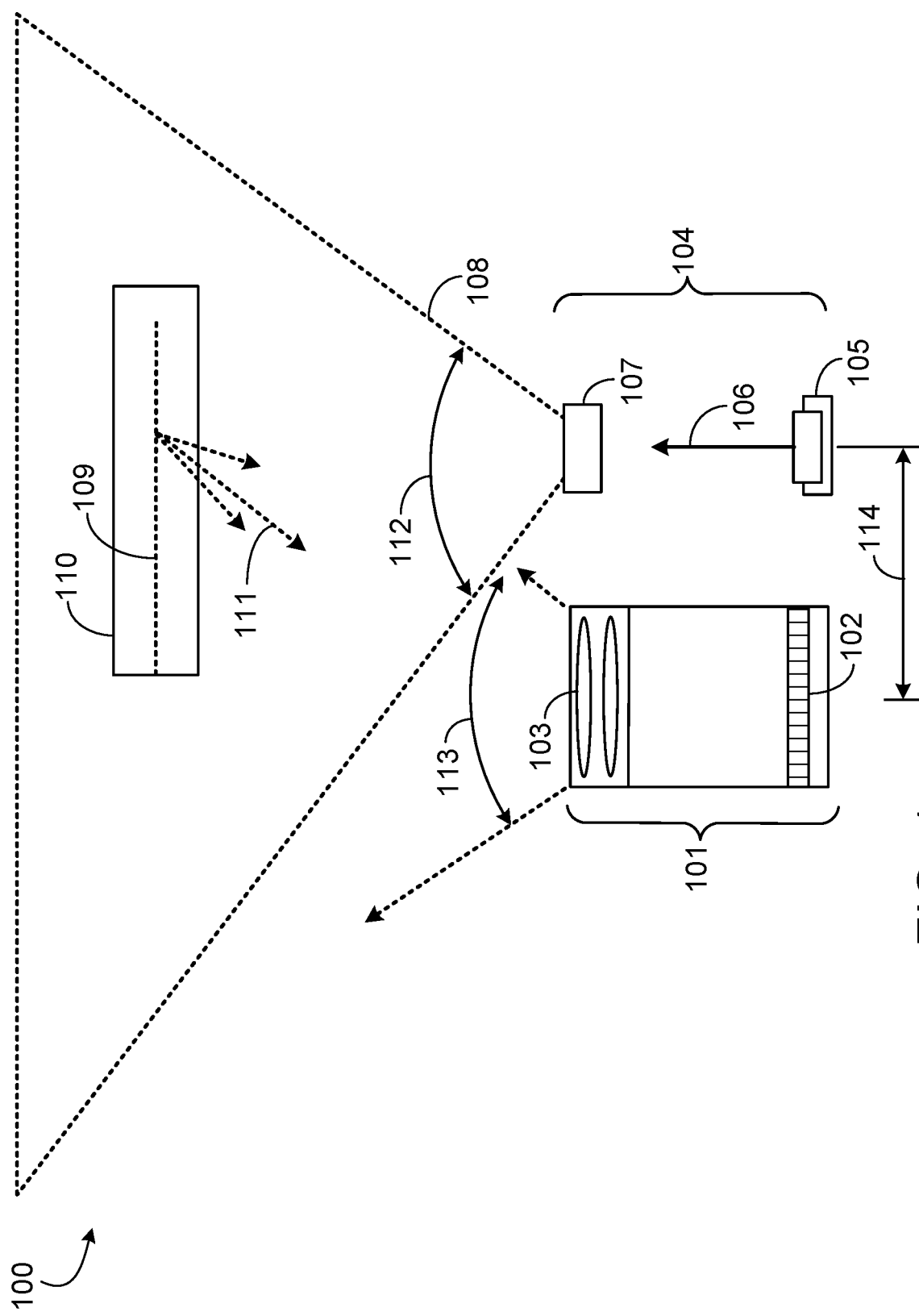
FIG. 1 depicts examples of an optoelectronic module with a modulated illumination source and a demodulation pixel array.

FIG. 1 depicts an example of an optoelectronic module 100 operable to capture distance data via a TOF mode and/or a TOF-triangulation mode. The optoelectronic module 100 includes an imaging assembly 101 and an illumination assembly 104. The imaging assembly 101 includes a demodulation pixel array 102 including a plurality of discrete demodulation pixels 102A, and an imaging optical assembly 103 wherein the imaging optical assembly 103 possesses an on-axis focal length 103A. The demodulation pixel array 102 includes an array of pixels 102A. The imaging assembly 101 may further include a plurality of lens elements, barrels, stops, apertures, and filters.

The illumination assembly 104 includes an emitter 105 (e.g., a VCSEL, a LED, or a laser diode) that produces emitted light 106. Emitted light 106 can be any wavelength or range of wavelengths of electromagnetic radiation (e.g., visible or non-visible radiation). Further, emitted light 106 may be near-, mid-, or far-infrared radiation, for example. In some implementations the emitter 105 can be operable to modulate the emitted light 106 such that the emitted light 106 is suitably modulated for time-of-flight applications. Emitted light 106 is incident on an illumination optical assembly 107. The illumination optical assembly 107 can be any one of, or combinations of any one of, the following optical elements: a diffraction grating, a microlens array, a lens, a prism, a micro-prism array, a diffractive optical element, other refractive optical elements, or a plurality of anyone of the aforementioned or their respective combinations. The illumination optical assembly 107 can further be composed of apertures, spacers, alignment features, and other components pertinent to its function and apparent to one of ordinary skill in the art. The emitted light 106 incident on the illumination optical assembly 107 produces an emission 108.

The emission 108 incident on an object 110 produces an illumination 109 on the object 110 in a scene. The object 110 can be illuminated by the illumination 109 when at a particular distance or range of distances (e.g., between a few millimeters and several or even tens of meters). The illumination 109 can be a single, discrete high-contrast feature and/or the illumination 109 can include an array of discrete high contrast features. The discrete high-contrast feature can be any shape, dot, line, or other geometric shape. Accordingly, the illumination 109 can take the form of a pattern of high-contrast features, for example, a discrete array of illuminated dots, lines, or other shapes, or combinations of the aforementioned. The distance between the high-contrast features can be strongly correlated with the intended application of the optoelectronic module 100 and the intended resolution of the optoelectronic module 100. The distance between the high-contrast features can be at least on the order of the dimension of the objects in the scene. Further the illumination optical assembly 104 can produce consecutive illuminations 109. For example, the illumination 109 can be a single high-contrast geometric shape at an instant when TOF-triangulation data is collected while at another instant the illumination 109 can be a pattern of high-contrast features when TOF data is collected.

At least part of the illumination 109 reflects from the object 110 to produce a reflected light 111. The reflected light 111 is focused by the imaging optical assembly 103 onto the demodulation pixel array 102 and processed. A distance-traveled phase-shift can be determined and correlated with the distance between the optoelectronic module 100 and the object 110. The illumination optical assembly 107 produces the illumination 109 with a first field-of-view 112. In addition, the imaging optical assembly has a second field of view 113. The second field-of-view 113 of the imaging optical assembly 101 can encompass the first field-of-view 112 of the illumination assembly 104; for example, the second field-of-view 113 of the imaging optical assembly 101 can be greater than the first field-of-view 112 of the illumination assembly 104. Alternatively, the second field-of-view 113 of the imaging optical assembly 110 can be substantially equivalent to the first field-of-view 112 of the illumination assembly 104. A baseline (i.e., a fixed baseline) can be defined as the distance between the emitter 105 and the on-axis focal length 103A. However, multiple pixel baselines 114A (i.e., inter-pixel baselines) can be ascribed to the distance between the emitter 105 and the pixels within the demodulation pixel array 102. That is, each pixel within the demodulation pixel array 102 can be ascribed an inter-pixel baseline 114A. In some cases, the inter-pixel baseline 114A can be defined as the distance between the emitter 105 and the edges nearest the emitter 105 of each respective pixel. The phase-shift described above can be correlated with distance between the object 110 and the demodulation pixel array 102 in accordance with known techniques.

Figure 2:
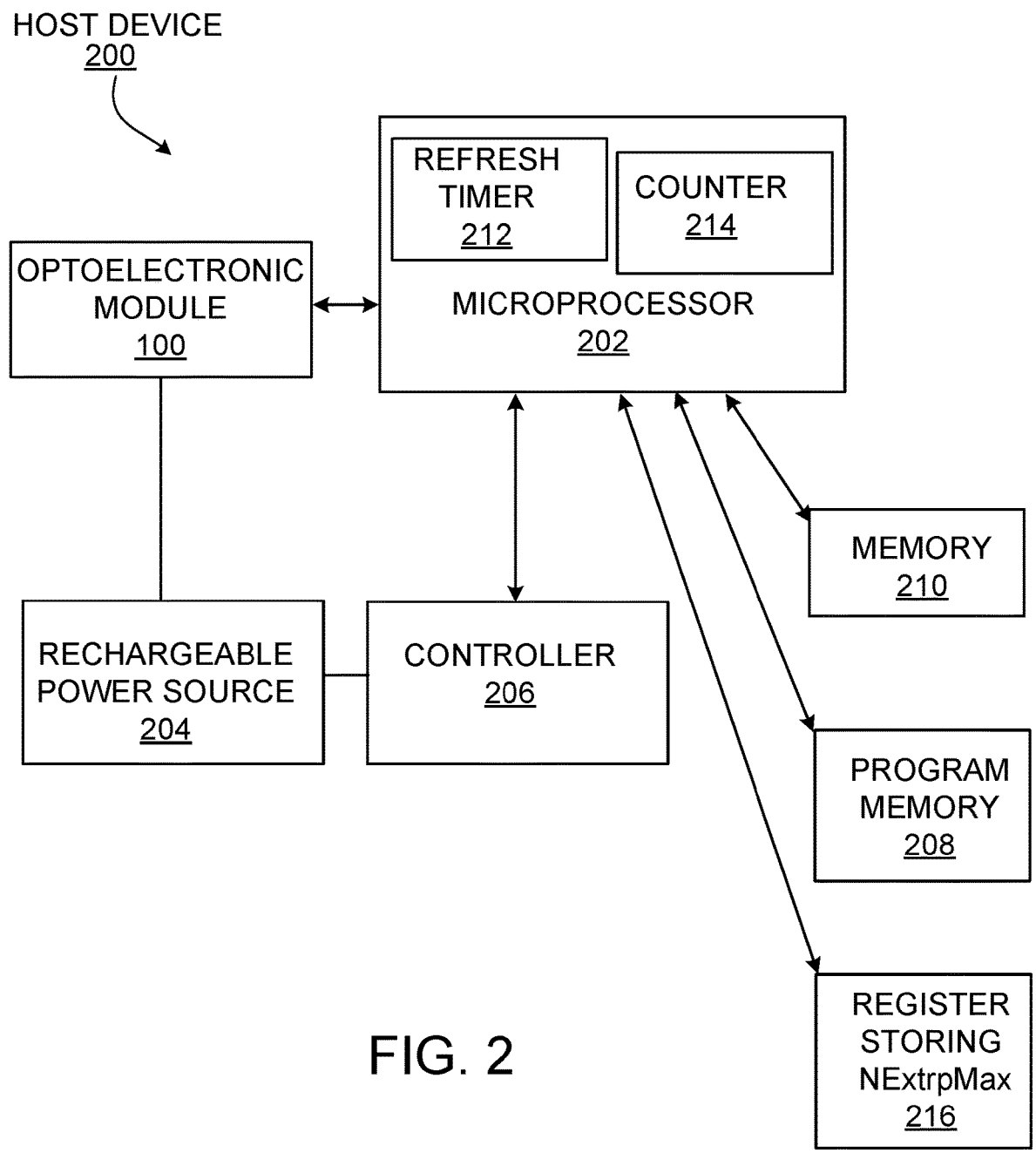
FIG. 2 depicts a block diagram of a host device in which the optoelectronic module is embedded.

As shown in FIG. 2, the optoelectronic module 100 can be embedded or otherwise integrated into a host device 200 such as a smart phone or other small electronic computing device (e.g., personal computer, e-book, kiosk, tablet or media player). The module 100 (or the host device 200) also includes a microprocessor 202 programmed to implement power savings and refresh control as described in greater detail below. In some implementations, aspects of the power savings and refresh control can be implemented in hardware (e.g., circuit elements such as transistors in an integrated circuit chip). The host device 200 also includes a power source, such as a rechargeable battery 204, as well as a controller 206 that controls the host device's overall operation. The power source 204 supplies power to components of the host device 200, including the module 100 (e.g., the emitter 105). Thus, turning on the emitter 105 and causing it to emit light signals increases power consumption and drains the power source 204.

In general, the microprocessor 202 implements software instructions that cause the module 100 to provide distance information at a predetermined (e.g., pre-programmed) refresh rate, but with a reduction in overall power consumption attributable to the distance determinations. In particular, rather than turning on the light emitter 105 each and every time distance information needs to be output, in some instances the module 100 extrapolates the distance information as described below. The power consumption, and thus the battery drain, for computing the extrapolated distance information tends to be less than the power consumption required for actual distance measurements (i.e., during which the emitter 105 emits a light signal toward the object). Thus, extrapolating the distance information at least some of the time rather than making an actual distance measurement can help reduce overall power consumption. On the other hand, the decision as to how often and when to extrapolate distance information should be balanced with the need for accuracy in the distance data.

In accordance with some implementations, the decision whether to make an actual distance measurement or to extrapolate distance information can be based on various factors, such as the speed of the object 110 to which distance is being measured, as well as a programmable parameter that controls the maximum number of consecutive extrapolations that are permitted before requiring that an actual distance measurement be made. In some instances, the object's acceleration also can be used as a factor in deciding whether to make an actual distance measurement or whether to use extrapolated distance information.

Figure 3:
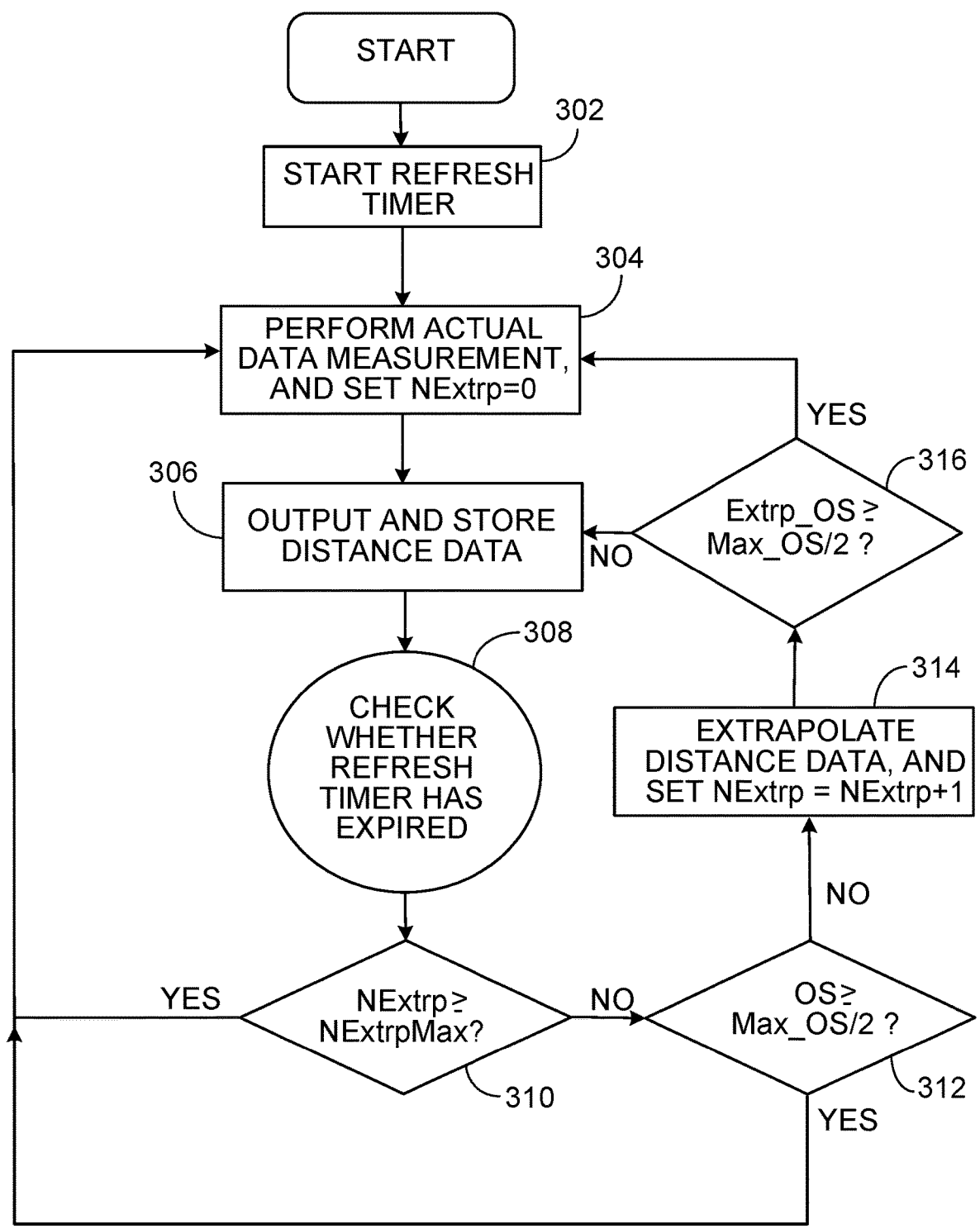
FIG. 3 is a flowchart of a method for implementing power savings through refresh control.

As illustrated in FIG. 3, a program implemented by the microprocessor 202 can be stored in memory (e.g., ROM) 208 and refreshes (i.e., initializes) a software timer 212 that indicates how often the module 100 is supposed to generate distance data (302). The timer 212 thus provides the programmed refresh rate. As indicated at 304, the program causes the module 100 to make an initial actual distance measurement. Thus, the module 100 emits a light signal toward the object 110 and senses light reflected by the object so as to calculate a distance to the object. As indicated at 306, the distance data is provided to the microprocessor 202 for storage in memory (e.g., RAM) 210. Each time the program causes the module 100 to make an actual distance measurement, it also sets a software counter (NExtrp) 214 to zero. The counter (NExtrp) 214 tracks the number of consecutive times extrapolated distance data is generated by the microprocessor 202. In the present example, it will be assumed that the maximum permitted number (NExtrpMax) of consecutive extrapolations is 1. This ensures that at least fifty percent of the time, the distance data generated by the module 100 will be based on actual measurements. However, the value of NExtrpMax may differ for other implementations, and as noted above, can be a user programmable parameter whose value can be stored, for example, in a register 216.

At 308, the program checks periodically whether the refresh timer 212 has expired. Once the refresh timer expires, the program proceeds to 310 to determine whether the current number of consecutive distance data extrapolations (NExtrp) is equal to or greater than the maximum permitted number of extrapolations (NExrtpMax). If the current number of consecutive distance data extrapolations (NExtrp) is equal to or greater than the maximum permitted number (NExtrpMax), then the program proceeds to send a signal to the module 100 to perform an actual distance measurement (304).

If, however, the current number of consecutive distance data extrapolations (NExtrp) is less than the maximum permitted number (NExtrpMax), then the program proceeds, at 312, to determine whether the current speed (OS) of the object 110 (as calculated based on prior distance measurements) is greater than a predetermined value. In some instances, the predetermined value is 50% of the assumed maximum speed of the object (i.e., Max_OS/2). If the object's current speed is greater than the predetermine value (i.e., greater than Max_OS/2), then it is assumed it is desirable to make an actual distance measurement rather than rely on an extrapolated value. In other words, if the object 110 is moving relatively quickly, it is likely preferable not to rely simply on an extrapolated value. Thus, the program proceeds to send a signal to the module 100 to perform an actual distance measurement (304). As indicated above, each time the module 100 is instructed to perform an actual distance measurement, the program resets the counter 214.

If, at 312, it is determined that the object's current speed is not greater than the predetermined value (i.e., Max_OS/2), then (at 314) the program extrapolates distance data and causes the counter 214 to increase by 1. The extrapolated distance data can be based on the previously obtained distance data stored in memory 210. The extrapolated distance data may also be based, for example, on the object's actual or estimated velocity and/or its acceleration. In some implementations, the extrapolated distance data then is output and saved to memory 210. In some implementations, however, it is preferable for the program first to determine whether the extrapolated speed of the object (Extrp_OS) is greater than the predetermined value (i.e., greater than Max_OS/2). The program makes this determination at 316. If the extrapolated speed (Extrp_OS) is determined not to be greater than the predetermined value (i.e., not greater than Max_OS/2), then at 306 the extrapolated distance data is output and saved to memory 210. On the other hand, if it is determined that the extrapolated speed (Extrp_OS) is greater than the predetermined value (i.e., greater than Max_OS/2), then instead of using the extrapolated distance data, the program sends an instruction to the module 100 to perform an actual distance measurement (at 304).

The foregoing technique can allow the number of actual distance measurements to be reduced, thereby helping to reduce overall power consumption, while maintaining the desired refresh rate. For example, assuming that 90% of the time the object's speed is less than half the object's anticipated maximum speed (i.e., Max_OS/2), and assuming that the maximum number of permitted distance data extrapolations (NExtrpMax) is set to 1 (i.e., extrapolated distance data is used about half the time when the object's speed is less than Max_OS/2), then power consumption resulting from actual distance measurements can be reduced by about 45% (i.e., 100%−[10%+(90/2)%]=45%). In addition, the program effectively can prevent the use of extrapolated distance data in specified situations, such as where the actual speed or extrapolated speed of the object is sufficiently high that using extrapolated data is likely to lead to unacceptable errors in the distance calculations. The present techniques can thus help increase the maximum latency, which indicates how quickly the device needs to detect relative movement of the object 110 with respect to the host device 200.

For implementations in which it is not desired to allow use of extrapolated distance data, the programmable parameter indicating the maximum number of consecutive times extrapolated distance data is permitted (NExtrpMax) can be set to zero. This may be desirable, for example, for application specific situations that involve critical distance thresholds. Setting the parameter NExtrpMax to zero effectively disables the power savings mode described in this disclosure. On the other hand, if one wishes to use extrapolated distance data at a higher rate, then a higher value for the programmable parameter can be selected (e.g., NExtrpMax=2).

Various modifications can be made within the spirit and scope of the present disclosure. Accordingly, other implementations are within the scope of the claims.

What is claimed is:

1. A refresh control method for generating distance data, the method comprising:
    generating distance data in accordance with a specified refresh rate, wherein the distance data is either generated by an optoelectronic module performing actual distance measurements or is generated by extrapolation;
    the method including determining whether a number of consecutive times distance data has been generated by extrapolation is greater than or equal to a specified maximum permitted number of times;
        if the number of consecutive times distance data has been generated by extrapolation since a most recent actual distance measurement greater than or equal to the specified maximum permitted number of times, then subsequently performing the actual distance measurement by the optoelectronic module to generate the distance data for a current instance; and
    determining whether a speed or acceleration of an object, with respect to which distance is to be determined, is greater than a specified maximum speed or acceleration, and
        if the speed of the object is greater than the specified maximum speed, or
        if the acceleration of the object is greater than the specified maximum acceleration,
        then subsequently performing the actual distance measurement by the optoelectronic module to generate the distance data for the current instance.

2. The refresh control method of claim 1 wherein the speed or acceleration of the object is determined using actual distance measurements.

3. The refresh control method of claim 1 wherein the speed or acceleration of the object is determined using extrapolated distance measurements.

4. The refresh control method of claim 1 wherein,
    if the number of consecutive times distance data has been generated by extrapolation is less than the specified maximum permitted number of times, and
    if the speed or acceleration are less than the specified maximum speed or acceleration,
    then subsequently generating the distance data by extrapolation for the current instance.

5. The refresh control method of claim 1 wherein the specified maximum permitted number of times equals one or more.

6. An optoelectronic module operable to generate distance data, the module comprising:
    an illumination assembly comprising an emitter operable to emit light signals at a particular wavelength or in a particular wavelength range;
    an imaging assembly comprising pixels to detect light reflected by an object external to the module, the reflected light being at the particular wavelength or in the particular wavelength range;

a processor system operable to generate distance data in accordance with a specified refresh rate, wherein the distance data is either generated by causing the emitter to emit a light signal for performance of actual distance measurements or is generated by the processor extrapolating the distance data based on previously acquired data, the processor further operable to determine whether a number of consecutive times distance data has been generated by extrapolation is greater than or equal to a specified maximum permitted number of times, and if, the number of consecutive times distance data has been generated by extrapolation since a most recent actual distance measurement is greater than or equal to the specified maximum permitted number of times, then subsequently causing the emitter to emit a light signal for performance of the actual distance measurement that the processor uses to generate the distance data for an current instance; and wherein the processor is further operable to determine whether the speed or acceleration of the object, with respect to which distance is to be determined, is greater than a specified maximum speed or acceleration; and if the speed of the object is greater than the specified maximum speed, or if the acceleration of the object is greater than the specified maximum acceleration, then subsequently causing the emitter to emit a light signal for performance of the actual distance measurement that the processor uses to generate the distance data for the current instance.

7. The optoelectronic module of claim 6 wherein the speed or acceleration of the object is determined using actual distance measurements.

8. The optoelectronic module of claim 7 wherein the speed or acceleration of the object is determined using extrapolated distance measurements.

9. The optoelectronic module of claim 8 wherein, if the number of consecutive times distance data has been generated by extrapolation is less than the specified maximum permitted number of times, and if the speed or acceleration are less than the specified maximum speed or acceleration, then subsequently generating the distance data by extrapolation for the current instance.

10. The optoelectronic module of claim 6 wherein the specified maximum permitted number of times equals one or more.

11. A handheld computing device comprising:
a rechargeable power source;
an illumination assembly comprising an emitter operable to emit light signals at a particular wavelength or in a particular wavelength range;
an imaging assembly comprising pixels to detect light reflected by an object external to the handheld computing device, the reflected light being at the particular wavelength or in the particular wavelength range; and
a processor system operable to generate distance data in accordance with a specified refresh rate, wherein the distance data is either generated by causing the emitter to emit a light signal for performance of actual distance measurements or is generated by the processor extrapolating the distance data based on previously acquired data, the processor further operable to determine whether a number of consecutive times distance data has been generated by extrapolation is greater than or equal to a specified maximum permitted number of times, and if, the number of consecutive times distance data has been generated by extrapolation since a most recent actual distance measurement is greater than or equal to the specified maximum permitted number of times, then subsequently causing the emitter to emit a light signal for performance of the actual distance measurement that the processor uses to generate the distance data for an current instance; and wherein the processor is further operable to determine whether the speed or acceleration of the object, with respect to which distance is to be determined, is greater than a specified maximum speed or acceleration; and if the speed of the object is greater than the specified maximum speed, or if the acceleration of the object is greater than the specified maximum acceleration, then subsequently causing the emitter to emit a light signal for performance of the actual distance measurement that the processor uses to generate the distance data for the current instance.

12. The handheld computing device of claim 11 wherein the rechargeable power source comprises a battery.

13. The handheld computing device of claim 11 wherein the handheld computing device is a smart phone.

14. The handheld computing device of claim 11 wherein the speed or acceleration of the object is determined using actual distance measurements.

15. The handheld computing device of claim 11 wherein the speed or acceleration of the object is determined using extrapolated distance measurements.

16. The handheld computing device of claim 11 wherein the specified maximum permitted number of times equals one or more.

17. The handheld computing device of claim 11 wherein
if the number of consecutive times distance data has been generated by extrapolation is less than the specified maximum permitted number of times, and
if the speed or acceleration are less than the specified maximum speed or acceleration,
then subsequently generating the distance data by extrapolation for the current instance.

* * * * *